US006268852B1

(12) United States Patent
Lindhorst et al.

(10) Patent No.: US 6,268,852 B1
(45) Date of Patent: *Jul. 31, 2001

(54) SYSTEM AND METHOD FOR FACILITATING GENERATION AND EDITING OF EVENT HANDLERS

(75) Inventors: Greg Lindhorst, Woodinville; John Buehler, Redmond; Martin Sonntag, Kirkland; Randall Lee Kerr, Redmond, all of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/867,011

(22) Filed: Jun. 2, 1997

(51) Int. Cl.[7] ................... G06F 3/14; G06F 9/44
(52) U.S. Cl. .............. 345/335; 345/967; 345/346; 709/315; 709/318; 707/513; 717/2; 717/10
(58) Field of Search ................ 345/335, 966, 345/967, 970, 346, 348, 333, 334, 356, 357, 353, 352; 709/303, 302, 328, 329, 315, 316, 318; 395/703, 702, 710; 707/501, 513; 717/3, 2, 10

(56) References Cited

U.S. PATENT DOCUMENTS

| 5,206,951 | * | 4/1993 | Khoyi et al. ................ 709/303 |
| 5,438,659 | * | 8/1995 | Notess et al. ............... 345/335 |
| 5,713,045 | * | 1/1998 | Berdahl ....................... 709/303 X |
| 5,717,877 | * | 2/1998 | Orton et al. ................ 345/348 X |
| 5,760,788 |   | 6/1998 | Chainini et al. ............ 345/967 X |
| 5,883,623 | * | 3/1999 | Cseri .......................... 345/335 |
| 5,890,170 | * | 3/1999 | Sidana ......................... 707/501 |

OTHER PUBLICATIONS

Bonner, "Visual Basic Meets the Internet", *Windows Sources*, vol. 4 No. 5, p. 203, May 1996.*
"Microsoft Intros Web Development Tools", *Newsbytes*, Jun. 10, 1996.*
"Microsoft Announces Immediate Availability of ActiveX Control Pad", The PointCast Network™, Aug. 21, 1996.
"Activating ActiveX", Internet World, Web Page Workshop, by Aaron Weiss, Jan. 1997, pp. 108–112.
"Sample Pages for the Microsoft ActiveX Control Pad and HTML Layout Control", Microsoft db Web, http://www.microsoft.com/ie/controls/layout/samples.htm, Microsoft Corporation, Jun. 7, 1996.
"ActiveX Control Pad Tutorial", http://www.microsoft.com/workshop/author/cpad/tutorial.htm, Microsoft Corporation, 1996.
"The Microsoft ActiveX Control Pad", http://www.microsoft.com/workshop/author/cpad/apad.htm, Microsoft Corporation, Jun. 5, 1996.
"Frequently Asked Questions About Developing Web Pages Using ActiveX Controls", http://www.ms.eunet.ro/workshop/prog/controls/ctrlfaq.htm, Microsoft Corporation, Jun. 25, 1996.
"ActiveX Controls", Microsoft Site Builder Workshop—Microsoft Internet Explorer, May 24, 1996.

* cited by examiner

Primary Examiner—Raymond J. Bayerl
(74) Attorney, Agent, or Firm—Banner & Witcoff, Ltd.

(57) ABSTRACT

A method and system for creating and editing event handlers that link events triggered on one object to actions taken on one or more different objects. The method provides a user interface having an event pane, action pane and codepane. A user selects an event icon in the event pane to link that event to a desired action in the action pane. The code that is generated in the code pane can be displayed in either a list view or a code view. In the list view, the event handler is presented to the user in simple, concise statements that are easy for the user to understand. In the code view, the actual event handler code in either VBScript or JavaScript languages is presented to the user.

63 Claims, 8 Drawing Sheets

SYSTEM AND METHOD FOR FACILITATING GENERATION AND EDITING OF EVENT HANDLERS

BACKGROUND OF THE INVENTION

1. Field of the Invention

This invention relates to software tools for facilitating the generation and editing of computer programs. Specifically, this invention relates to software tools for facilitating the generation and editing of an event handler program that links an event associated with one object to an action taken by another object.

2. Description of the Related Art

In current object-oriented software environments, the objects themselves include commands for triggering outside (event-handling) programs once a pre-determined event is triggered. For example, one standard event within the Microsoft Windows environment is a "mouse click" event. This. type of event is triggered whenever a user depresses a mouse button while the mouse cursor is on top of the object. As the user depresses the mouse button, an event-handling program associated with the mouse click event is triggered.

Thus, particular event-handling programs can be triggered by associating them with a pre-selected event. However, writing these event-handling programs is a complicated and time-consuming task. Normally, only computer programmers have the ability to write event-handling software. For this reason, many novice computer users cannot take advantage of this powerful technology.

One of the object-oriented technologies that takes advantage of event driven applications is Microsoft's ActiveX technology for the Internet. Users can add ActiveX components to their Hypertext Markup Language (HTML) documents so that particular events, such as a mouse click, can be used to trigger a particular event-handler. For example, an ActiveX object's mouse click event could be linked to an event handler that connects the user to another HTML document. In this manner, the ActiveX object would act like a hyperlink to other documents on the World Wide Web.

A powerful feature of current Internet technology relates to programs or scripts which run when a user selects a particular item within an HTML document. For example, a user might fill in a form on an HTML document and then depress a "submit" button to send that form to an Internet host. When the "submit" button is depressed by a mouse click, a program or script is run instructing the user's computer to gather data from the form and forward it to a pre-designated Internet site. Some scripts that are run on Internet server computers to process forms and the like are known as Common Gateway Interface (CGI) scripts. Other software for producing programs used on the Internet include the Visual Basic Language, Java Language, Visual Basic script an (VBScript) language from Microsoft Corporation and the JavaScript language. More information on the VBScript language can be found in *Inside Microsoft Visual Basic, Scripting Edition* by Scott Hillier (Microsoft Press).

Unfortunately, implementing these scripts as ActiveX event-handling programs in an HTML document can be extremely complicated and require a thorough knowledge of programming languages and environments. The VBScript and JavaScript languages require extensive programming knowledge to implement. Thus, it can be difficult for a novice computer user to create an HTML document that includes scripts and programs that provide for a flexible world-wide web site. For this reason, a simple, convenient method is needed for producing an event handler that links an event on one object in an HTML document to an action taken by a second object within the HTML document. The present invention provides such a solution.

SUMMARY

The present invention comprises a software program for creating and editing event handlers that are linked to objects embedded within an HTML or other Internet document. Objects are software programming components such as Microsoft Object Linking and Embedding (OLE) 2.0 objects, Corba Objects, Java Beans and OpenDoc objects. These software programming components are pre-existing modules that do not need to be modified to work within embodiments of the invention.

As used herein, the term Internet document refers to any document that can be read by Internet browsing software such as Netscape Navigator or Microsoft Internet Explorer. Types of Internet documents include HTML and Two Dimensional Markup Language (2DML) documents. An example of a 2DML document is provided in Microsoft "ALX" files that are produced by the Microsoft ActiveX Control Pad. It should also be understood that the term "Internet document" is intended to encompass any protocols or specifications that are adopted in the future to page layouts that are distributed across wide area networks.

However, for simplicity, the following description uses the terms Internet document and HTML document somewhat interchangeably. Using the program described herein, the user can generate and edit event handling scripts visually (via mouse clicks), without typing in or directly editing the underlying script code. In addition, the program displays a non-executable "plain English" narrative of the event handler scripts that have been generated.

In one embodiment, the program includes a user interface that can display graphical representations of objects, events and actions. These graphical representations are preferably displayed in separate regions or panes within a user interface window. The preferable form of the graphical representations is a hierarchical tree. The first ("event") pane includes a list of objects from the HTML document that have events which can be triggered. These objects can include ActiveX objects, scriptable HTML tags, browser window objects and any other component embedded within the Internet document.

As discussed above, an object's event is triggered when a particular user action occurs. Thus, the software monitors regions of the user interface for interactions from the user. Examples of user actions include a mouse click, a mouse double-click and a SUBMIT button. Once the user performs an action that triggers an event, the corresponding event handling software ("event handler") is initiated and run on the computer system. It should be noted that a user action is not necessarily required to trigger an event. For example, a timer object may include a timer event that is triggered once. a pre-determined period of time has elapsed.

The second ("action") pane of the user interface includes a list of objects from the HTML document that provides actions. In this environment, an action can be a property or a method of an object on the HTML document. For example, an action might be the background color property for the chosen object.

In response to mouse clicks on the objects within the event and action panes, the program automatically generates a script that link events in the event pane to actions in the action pane. For example, a user can link a mouse click event for a first object listed in the event pane to a color property action for a second object listed in the action pane. The program then provides the desired link between the event and the action by generating a script in VBScript or. JavaScript, and displaying the script in a code pane (discussed below). In the example from above, a user could cause the second object to change color following a mouse click on the first object. Therefore, when this particular HTML document is accessed through an Internet browser, any consumer that performs a mouse click on the first object will cause a color change in the second object.

The third ("code") pane of the user interface displays the event handler, which can either be an event handler interactively generated by the user via the event and action panes (in the manner described above), or a pre-existing event handler of the HTML document being edited. From the user interface, the user can select between one of two formats for viewing the event handler within this pane. In the first format, termed herein the "list" view, a plain English description of the link established between the first object's event and the second object's action is displayed. In the second format, termed herein the "code" view, the user can view and build the actual Visual Basic Script(VBScript) or JavaScript code that links the first object's event to the second object's action.

The event handling programs are built by first filtering only those actions that are appropriate for script generation. In addition, data-type specific dialog boxes are displayed to allow the user to set properties associated with the objects. For example, if the user chooses to modify an action corresponding to a color property, the user is presented with a Windows color palette to select the proper color.

Since the event handler scripts are generated automatically in response to selection (via the mouse) of events and associated actions, it is not necessary for the user to learn the underlying programming language. In addition, since the program displays the code in an easy to understand list view, the user does not need to be concerned with programming syntax to review the links that have been established. With this system, even a novice user can add creative scripts that link objects to actions.

DETAILED DESCRIPTION OF THE PREFERRED EMBODIMENTS

Figure 1:
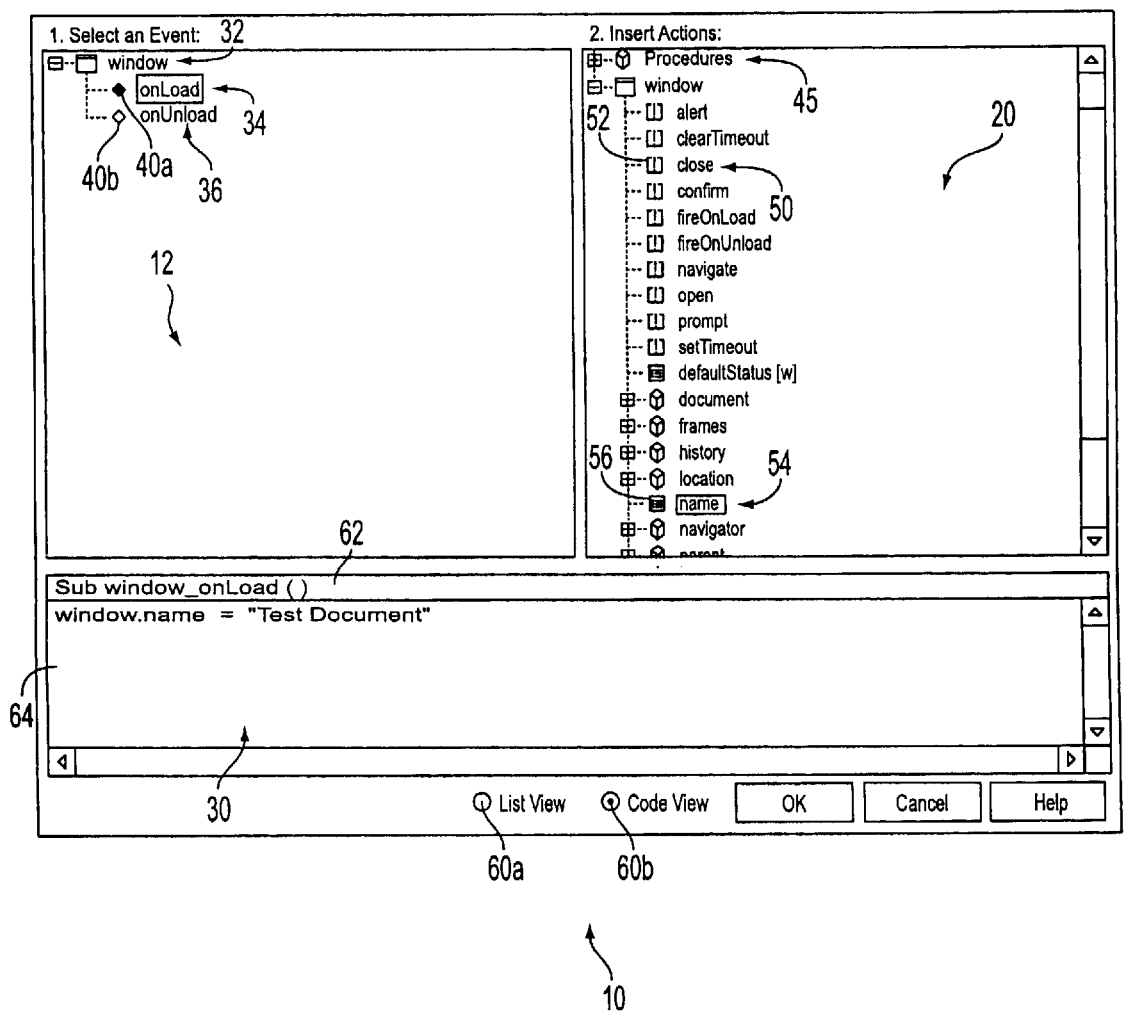
FIG. 1 is a screen capture of an embodiment of the present invention illustrating an event pane, an action pane and a code pane. The code pane is illustrated using the code. view feature.

The present invention comprises a method and system for creating and editing event-handling programs in an object oriented environment on a computer. The embodiment of the software described herein provides the user with a simple, graphical interface to create Visual Basic Script (VBScript) and JavaScript event handlers that link events from a first object to actions of a second object. Via this interface, the user can write event handlers without writing a single line of code, and without knowledge of the syntax of the underlying programming language. In addition, the user can view the event handlers (and event handlers written by prior users) in a plain English format that can be understood by a non-programmer.

As discussed above, an embodiment of the system and method includes software that graphically represents the objects, events and actions to be scripted in a user interface having three distinct panes: an event pane, an action pane and a code pane. The user does not need to learn complicated programming languages to create scripts that link an event triggered on one object to a resultant action on a second object.

In addition, the user is provided with a list view that displays a simple narrative reflecting the linkage generated between the event and the action to be taken. Using this feature, the user can quickly determine if the generated script will perform the desired function. More details on the *list view are provided below.

As discussed above, the event pane includes a list of objects located on the current document, and the associated events that can be triggered from each one of the listed objects. In one embodiment, an indicator is displayed along with each event so that the user can quickly determine which event has an associated script. In the action pane is a list of objects on the current page and the associated actions that can be taken for each object. For example, an action might be the "close" method of a window object on the document.

To facilitate a complete understanding of the invention, the remainder of the detailed description is arranged within the following sections and subsections:
  I. Glossary of terms and acronyms
  II. Overview of the system
    A. The event pane
    B. The action pane
    C. The code pane
    D. Process overview
    E. Data structure overview
  III. Parsing documents
  IV. Generating scripts
  V. Displaying scripts in list view or code view
  VI. Rebuilding documents from memory storages
  VII. Other embodiments
  VIII. Conclusion
I. Glossary of terms and acronyms The following terms and acronyms are used throughout the detailed description:

Internet. A collection of interconnected (public and private) networks that are linked together by a set of standard protocols to form a distributed network.

HyperText Markup Language (HTML). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or "HTML document") is subsequently transferred from a Web server to a Web browser, the codes are interpreted by the Web browser and used to parse and display the document. In addition to specifying how the Web browser is to display the document, HTML tags can be used to create links to other websites and other Web documents (commonly referred to as "hyper-links"). For more information on HTML, see Ian S. Graham, *The HTML Source Book,* John Wiley and Sons, Inc., 1995 (ISBN 0471-11894-4).

Two Dimensional Markup Language (2DML). A two dimensional markup language based on HTML for placing objects at specific two dimensional coordinates on a computer screen. An example of a 2DML document is implemented in Microsoft "ALX" files that are read by the Microsoft HTML layout control program. In addition, 2DML documents can be produced using two dimensional layout software such as the Microsoft ActiveX control pad program.

HyperText Transport Protocol (HTTP). The standard World Wide Web client-server protocol used for the exchange of information (such as HTML documents, and client requests for such documents) between a Web browser and a Web server. HTTP includes a number of different types of messages which can be sent from the client to the server to request different types of server actions. For example, a "GET" message, which has the format GET. <URL>, causes the server to return the document or file located at the specified Universal Resource Locator (URL).

World Wide Web ("Web"). Used herein to refer generally to both (1) a distributed collection of interlinked, user-viewable hypertext documents (commonly referred to as "Web documents" or "electronic pages" or "home pages") that are accessible via the Internet, and (2) the client and server software components which provide user access to such documents using standardized Internet protocols. Currently, the primary standard protocol for allowing applications to locate and acquire Web documents is the HyperText Transfer Protocol (HTTP), and the electronic pages are encoded using the HyperText. Markup Language (HTML). However, the terms "Web" and "World Wide Web" are intended to encompass future markup languages and transport protocols which may be used in place of or in addition to the HTML.

II. Overview of the system

The preferred embodiment of the invention is a software program termed herein the "Script Wizard". The Script Wizard program is initialized in a modal window that can be incorporated into many types of Internet editing software. For example, the Script Wizard can be incorporated into ActiveX Control Pad software or FrontPage 97 software from Microsoft Corporation. Launching of the Script Wizard can be handled by the host application editor menus or toolbars.

The Script Wizard software can be run under many operating systems, but is preferably run under Microsoft Windows 95 or Windows NT. A computer system that includes an Intel Pentium processor and sixteen megabytes of memory is preferable. However, other types of compatible computer hardware are contemplated within the spirit of the invention.

FIG. 1 is a printout of a display screen from a computer that is running the Script Wizard software. As can be seen, the Script Wizard user interface 10 includes an event pane 12, an action pane 20, and a code pane 30; each of which is described below.

A. The event pane

Referring to FIG. 1, an event pane 12 appears in the left upper corner of the Script Wizard user interface 10 and provides a hierarchical view of all the events which can be triggered to fire on the associated HTML document or 2DML document.

Objects which appear in the event pane include the following:
1) ActiveX Controls.
Objects specified with the <OBJECT> HTML tag, which provide an object class ID in the "CLASSID=" attribute, and which provide an "ID=attribute". All ActiveX controls are shown, even if they are not currently scripted.
2) Scriptable HTML elements.

There are also container objects that can be listed within the event pane 12. These container objects form a new level in the hierarchy. All objects within the container appear in the hierarchy under the container. If an object appears outside of a container, it is placed at the top level of the hierarchy. The types of containers that are recognized are summarized below in Table 1.

TABLE 1

Summary of Container Types

| Containers | Description |
| --- | --- |
| Forms | Outlined in HTML by <FORM> tags. |
| ActiveX Layout regions: | Specified with<br><DIV STYLE = "LAYOUT:FIXED" . . . > . |

Objects are listed within the event pane 12 in alphabetical order and in a case insensitive form. Under each object in the hierarchy are listed the events that the respective object can trigger. For example, in FIG. 1, the event pane 12 lists a window object 32 which includes two events, an onLoad event 34 and an onUnload event 36. These objects are preferably Microsoft OLE 2.0 objects and include sets of pre-programmed events and actions.

Events that have associated actions are indicated in the event pane 12 by showing an indicator (solid diamond-shaped icon) to the user. Events which do not have any associated actions are listed in the event pane 12 with a hollow diamond-shaped icon. From a quick review of the events and icons in the event pane 12, the user can determine which events have associated actions.

As illustrated in FIG. 1 a solid diamond-shaped indicator 40*a* is associated with the onLoad event 34 to indicate that a script is associated with this event.

Navigation through the hierarchies of the event and action panes 12, 20 is identical to that in the Windows 95 Explorer. Double clicking with a mouse on an object will expand that object's list of methods and properties.

Another item at the top level of the event pane hierarchy is the Window object 32 which provides the user with a hierarchical list of browser window events that can be associated with actions. Although the window object 32 is not an object taken from the HTML document, its events can be associated with actions in the same manner as any other. object. When editing an HTML document, this part of the event tree is filled in by the typeinfo for the Microsoft Internet Explorer window object, thus listing all events that can be fired by the browser itself. When editing a 2DML file, the extent of the window object which is exposed is defined in the 2D Layout runtime specification.

To select what code is displayed in the code pane 30, the user clicks (single) on an event in the event pane 12. If there is an event handling code already linked to the chosen event, that program is displayed in the code pane 30. If there is no program code currently associated with the event, the code pane 30 remains empty.

Whenever an event is selected in the event pane 12, the code pane 30 will be updated to display the VBScript or JavaScript program that is associated with the selected. event. For example, if the user scrolls up and down through a tree of events in the event pane 12, the code pane 30 will change to display the currently selected event handler.

For the Object Linking and Embedding (OLE) based objects listed in the event pane 12, all information displayed to the user about elements is taken from the user's system OLE registry. If the OLE registry does not contain information about a particular object, the events, methods and properties of that object will not appear in the event pane 12 or action pane 20, although the item itself will be displayed, with an indication of its lack of type information.

If a scriptable HTML element does not have a "ENAME=" value, the Script Wizard program uses the "ID=" value to generate a unique name for the element. IF the "ID=" value does not exist, the Script Wizard looks at the "VALUE=" for the scriptable HTML element. However, if the scriptable HTML element has neither a "NAME=" value, "ID=" value or "VALUE=" value variable, a label based on the type of HTML element is created. The pattern used to create the label is "(Unnamed XXX element)". For example, if a SELECT type HTML element does not have a "NAME=" value, "ID=" value or "VALUE=" value, a label called "(Unnamed SELECT element)" is generated. Objects specified in the HTML document with an <OBJECT> tag that have no ID=attribute are not shown in either the event pane 12 or action pane 20.

B. The action pane

The action pane 20 appears in the right upper corner of the Script Wizard window 10. It provides a hierarchical view of all actions, which include methods, properties and variables that can be invoked or changed on the HTML document. The hierarchy of objects and actions listed in the action pane 20 is identical to that of the objects and events listed in the event pane 12, with the difference that actions are displayed in place of the events. Various icons are used to differentiate between the types of actions listed in the action pane 20.

As shown in FIG. 1, the action pane 20 includes a procedures object 45 and window object 47. The window object 47 includes numerous associated actions, each having an indicator illustrating the type of action associated with the object. For example, the "CLOSE" action 50 includes an associated method icon 52 indicating that the close action is a method. As can be seen, the name action 54 includes a property indicator 56 indicating that the name action is a property. Thus, a user can easily determine which action is a method, property, or variable based on its associated indicator.

Global, pre-scripted actions ("Canned actions") also appear as being associated with a particular object where appropriate. Canned actions are described in more detail below.

Two special items appear at the top level of the action pane hierarchy. One of the special items is the "Global Variables" object. This object expands to display all defined global variables on the HTML document. Global variables are listed in alphabetical order on the action pane 20. If no global variables exist on the HTML document, the "Global Variables" object is not displayed.

The other item at the top level of the hierarchy is the "Procedures" object. This object expands to display all defined functions on the HTML document, including VBScript event handlers (of the form of the Visual Basic command "sub object_event"). Functions are listed alphabetically in the action pane 20. If no such functions exist on the HTML document, the Procedures object is displayed, but has no children in the hierarchical tree.

When an action listed in the action pane 20 is selected by a mouse click, the chosen action is inserted into the code pane 30 at the insertion point. Properties and global variables are inserted as the property name and methods are inserted as the method name followed by "( )" (and a "CALL" statement for VBScript). In the list view, if the method/function takes arguments, the arguments passed into the event handler are passed through to the method/function.

The action pane 20 includes a context menu (not shown) that pops up if the user depresses the right mouse button while the mouse cursor is positioned within the action pane 20. The context menu includes the following choices, each of which is discussed below:

New Global Variable

New Procedure

Edit

Delete

New Global Variable

The new global variable option on the context menu allows the user to input a new global variable into the action pane 20. Once this option is selected, a dialog box is presented requesting the name of the new variable. The name of the global variable can then be entered, and the following lines are inserted into the beginning of the HTML/2DML document:

| | |
|---|---|
| dim user-supplied-name | (VBScript) |
| or | |
| var user-supplied-name | (JavaScript) |

The user may include subscripts or an initial value in the proper syntax for the language in use. A check of the syntax is performed to ensure that the script being created is legal. If the new line of script does not parse properly, the user is prompted to change the declaration or to cancel the new variable.

New Procedure

The new procedure option on the context menu causes a new, empty, procedure to appear in the code pane with the following prototype:

| | |
|---|---|
| sub procedure1( ) | (VBScript) |
| or | |
| function procedure1( ) | (JavaScript) |

The number "1" is replaced by the next numbered "procedure" not already used on the page.

Delete

Choosing the Delete option when a global variable is selected deletes the currently selected variable in the action pane 20. Choosing the delete command when a procedure is selected in the action pane 20 removes the procedure from the HTML/2DML document.

Edit

Selecting the Edit option when a global variable is selected in the action pane 20 allows the user to edit the declaration of the variable. For example, the user can add/remove subscripts (VBScript) or initial values (JavaScript). Choosing the Edit command when a procedure is selected in the action pane 20 brings up the procedure as if it were an event handler and displays the script for the procedure in the code pane 30 until another function or event handler is selected.

C. The code pane

The code pane 30 appears at the bottom of the Script Wizard window 10, below the event pane 12 and action pane 20. The code pane 30 displays the event-handlers that are associated with the objects in either of two views, the code view and the list view. These two views are selected by depressing radio buttons 60a,b at the bottom of the Script Wizard window. In addition, the pop-up context menu in the code pane 30 can include options for selecting the list view or code view.

Figure 2:
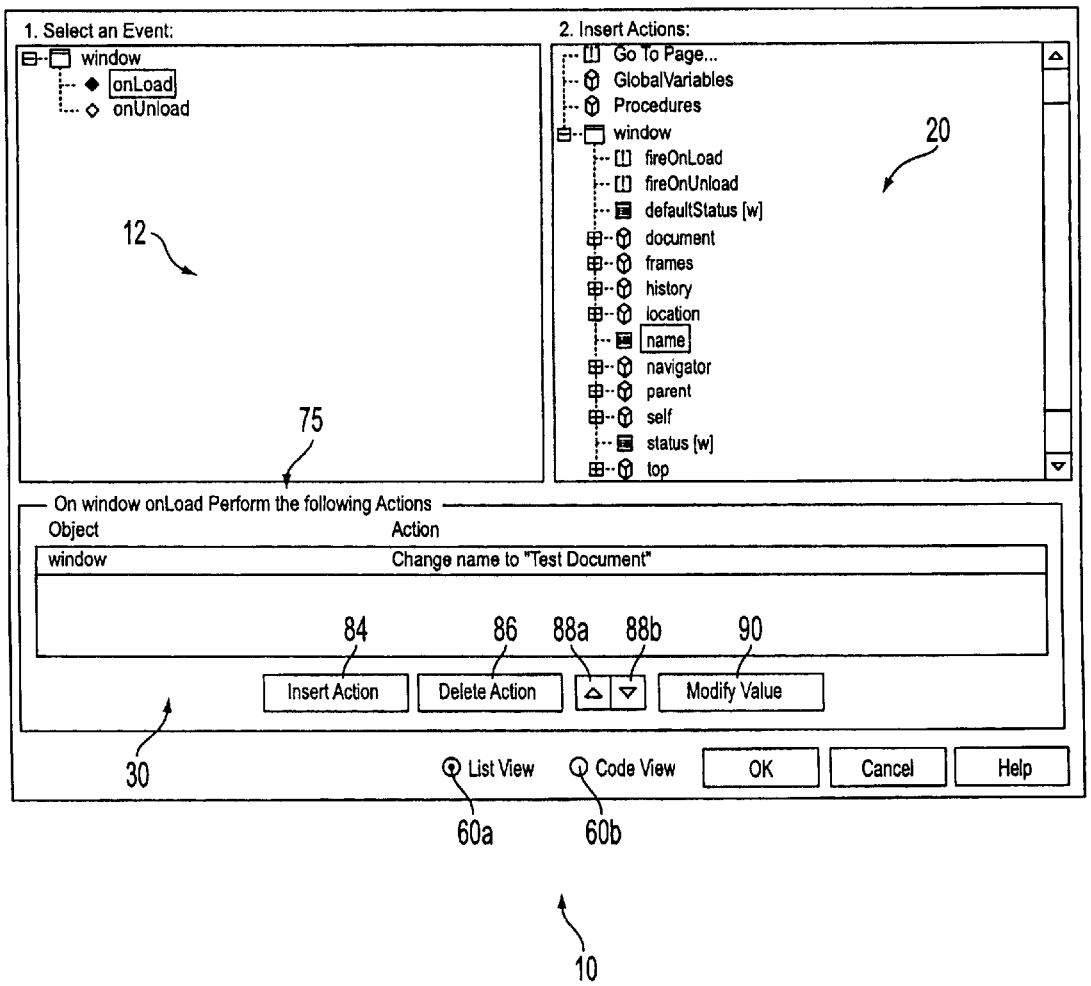
FIG. 2 is a screen capture illustrating an embodiment of the list view feature in the embodiment of FIG. 1.

In the screen display of FIG. 1, the event pane 12 onLoad event 34 is linked to the action pane 20 name property 54 so that when the window initially loads into an Internet browser, the name of the window changes to "Test Document." As illustrated by FIG. 1, a user can select the code view radio button 60b to see the actual VBScript or JavaScript program that associates the onloado event to the window.name action. Alternatively, the user can depress the radio button 60a to see a one-line, English language description of the linkage between the onLoad event and the window.name action, as illustrated in FIG. 2.

CODE PANE (CODE VIEW)

When the code pane 30 is placed in code view (as illustrated in FIG. 1), a header line 62 of the code pane 30 contains the context for the generated script, based on the event handler or procedure selected for editing. Below the header line 62 is a large edit control 64 that contains a listing of the script program. The actual display in the code pane 30 is based on whether the script is included in the HTML/2DML file as a function, script tag or in-line event handler, as set forth below:

Function

If the event to be linked is a function (including function defined event handlers), the following prototype is used to generate the script.

```
Sub object_event ()      (VBScript)
<SCRIPT for = object event = event>    (JavaScript)
```

Note that in the case of VBScript, the end statement in the routine, "end sub", is not displayed in the code view but is inserted by the software. Similarly, in the case of JavaScript, the end statement </SCRIPT> is inserted by the software.

When displaying a procedure, but not an event handler, the entire prototype can be edited in the code pane 30. The user can choose the context menu within the code pane 30 or click in the prototype area to cause the prototype area to change into an editable text box. After editing, the line of script will be re-parsed for validity, and the prototype line will again be made unavailable.

Script Tag

If the event handler is represented using an HTML SCRIPT element, the <SCRIPT> tag details are displayed in the header line 62 as shown below:

<SCRIPT for=Button2 event=DblClick>

In-line event handlers

Inline event handlers are handled in a manner similar to the SCRIPT tag case, but the header line 62 includes the following attributes of the tag which contains the script: tag, type (if appropriate), name/value/none, and event. For example, the following tag:

```
<INPUT TYPE = "button" NAME = "Button2"
       VALUE = "Press Me" OnDblClick = "call example">
``` would show the following header line:

<INPUT TYPE="button" NAME="Button2" OnDblClick= . . . >, where the script "call example" included in the tag is, shown in the editable code pane 30. The header line 62 is not editable by the user.

When the code view radio button 60b is selected, the code pane 30 has the following context menu:

List View . . .

Cut

Copy

Paste

Font . . .

Edit Procedure Prototype

The "List View . . . " context menu option changes the code pane 30 into a list view. The Cut and Copy options are only-enabled when something is selected in the code pane 30. Choosing these options causes the selected region in the code pane 30 to be copied to the Windows clipboard. The Paste option is only enabled when a text object has been saved to the Windows clipboard. By choosing the Paste option, the clipboard text is inserted at the insertion point within the code pane 30.

The Font option from the context menu brings up a font selection dialog for the code pane 30 that allows font changes in the text area and the function prototype area. The Edit Procedure Prototype option is disabled when editing is not allowed, as discussed above.

CODE PANE (LIST VIEW)

As discussed above, the code pane 30 lists the script, program in either a code view or a list view, depending upon which ratio button 60a,b is currently selected. In FIG. 2, a screen capture of a Script Wizard user interface 10 is illustrated wherein the list view button has been depressed.

The list view feature of the Script Wizard user interface 10 allows novice programmers to view the script program they create in a plain English language simplified statement that is easy to understand. The list view works on the concept of a simple association between an event and a set of "simple actions." Four types of simple actions are supported:

1. Any method invocation on any object or procedure which takes no arguments.

2. Any method invocation on any object or procedure. that takes the same number and names of arguments as the event handler.

3. Any canned actions which are discussed in more detail below.

4. Any assignment to an object property or global variable.

In list view, the action pane 30 only shows the simple actions which can be associated with a particular event, and all properties and global variables. Read-only properties are not shown in the action pane, to prevent a user from attempting to set them. Note that this means that the action pane can change when clicking between event handlers.

As shown in FIG. 2, while in the list view, the code pane 30 provides a list view header line 75 that provides a one-line description of the object and event to be linked to a chosen action. For example, in FIG. 2, the list view header line 75 includes the statement:

"On window onLoad Perform the following Actions"

This statement provides the user with a simple, easy to understand narrative description of the object (window onLoad) that is to be linked to a particular action. It can also be seen that the code pane 30 reveals the name of the object and action to be linked to the event chosen in the event pane 12.

In the embodiment illustrated in FIG. 2, the window onLoad event is linked to the action of changing the name of the window to "Test Document". It should be noted that the action is described in a simple English language manner so that the user can easily determine which events are linked to particular actions. Thus, a novice user can link events in the event pane 12 with actions listed in the action pane 20 while viewing a simple English language translation of the link between the chosen event and action.

While in list view, the code pane 30 also includes several buttons that can be triggered by the user to edit the actions described in the code pane 30. For example, an insert action button 84 can be depressed to allow the user to insert an action within the code pane 30 that is to be linked with a particular event.

Similarly, a delete action button 86 can be used to delete an action so that it is no longer linked with a particular event in the event pane 12. A set of ordering buttons 88a,b provide the user with a mechanism for moving the selected action up or down one step within the code pane 30. A "Modify Value . . . " button 90 provides the user with the ability to modify the value of the action linked to the chosen event.

For example, in the screen display of FIG. 2, the user could depress the "Modify Value . . . " button so that when a window onLoad event occurred, the resulting action would be to change the name of the window to "New Test Document" instead of "Test Document." These buttons, therefore, provide the user with tremendous flexibility for linking actions to particular events in the event pane 12. The overall process of opening a document to edit and create event handlers to link events to actions is described more specifically below.

D. Process overview

Figure 3:
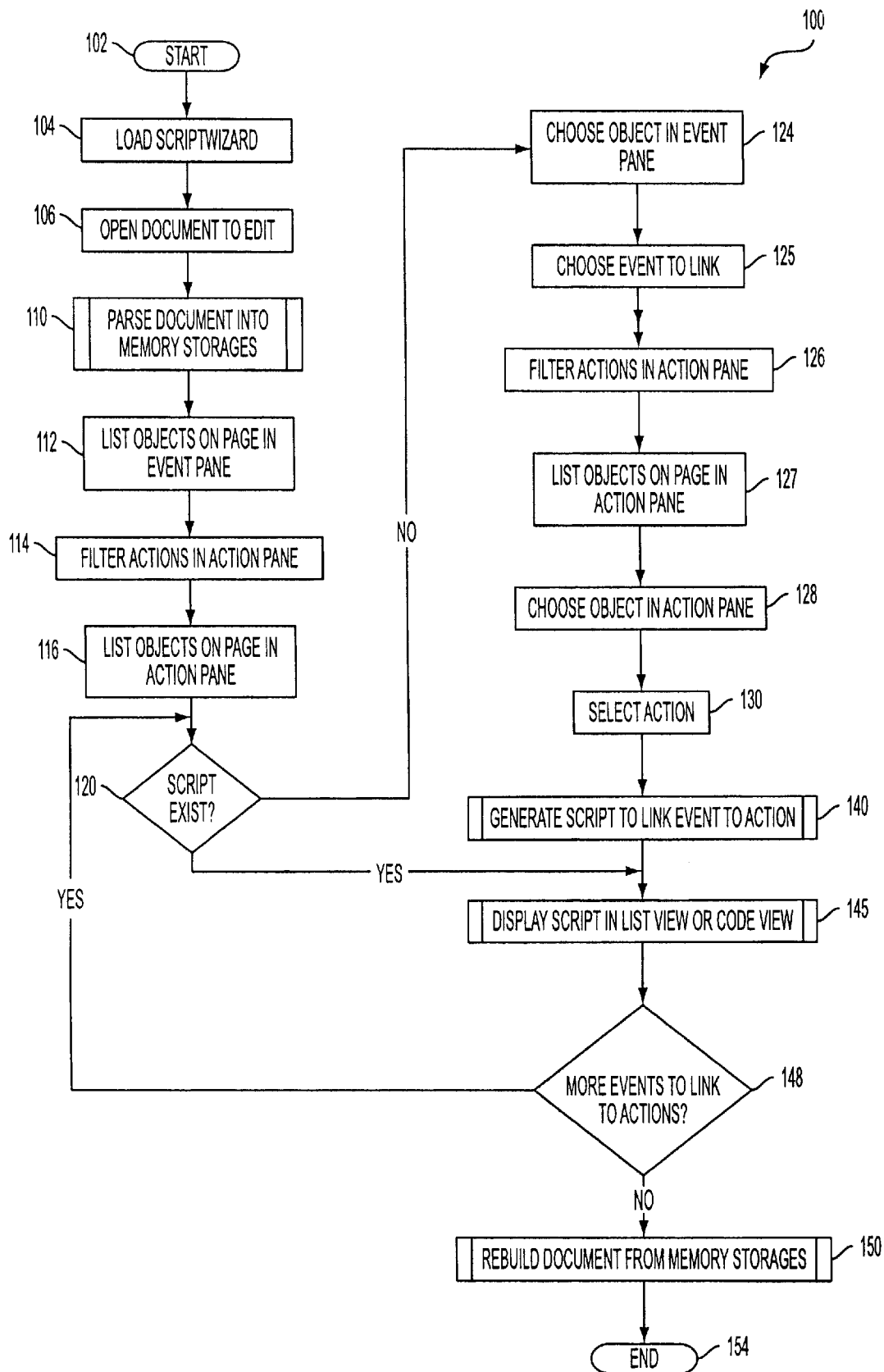
FIG. 3 is a flow diagram illustrating the overall process of opening a document to edit and link events to actions.

FIG. 3 provides an overview of the process for opening a document to edit and link events to actions within that document.

Referring to FIG. 3, the process 100 of linking an event to an action begins at a start state 102 and moves to a state 104 wherein the Script Wizard software is loaded into the memory of a computer. Once the Script Wizard software is running on the computer, the process 100 moves to state 106 wherein a document to be edited is opened. Normally, the document is an HTML document written in hypertext markup language (HTML) or a two-dimensional markup language (2DML) language.

After a document has been opened at the state 106, the process 100 moves to a process 110 wherein the document is parsed in order to separate the objects, HTML text, and scripts from one another. As will be explained below, the objects, HTML text and scripts are separated from one another and stored in memory storages so that they can be acted upon individually by the Script Wizard software. The process 110 of parsing documents into memory storages is described in more detail below in reference to FIG. 5.

Once the document to be edited has been parsed at the process 110, the process 100 moves to state 112 wherein the parsed objects from the page are listed in the event pane 12, as illustrated in FIG. 1. Once the objects have been listed in the event pane 12, the actions to be listed in the action pane 20 are filtered at state 114 so that only actions that are appropriate for scripting are listed. The process 100 then moves to state 116 wherein the objects and actions from the page are listed in the action pane 20, as illustrated in FIG. 1.

Once the events and actions have been listed in their respective panes, the process 100 moves to a decision state 120 wherein a determination is made whether any scripts exist in the parsed document. If the document does not contain any scripts at the decision state 120, the process 100 moves to a state 124 wherein an object listed in the event pane 12 may -be chosen by the user.

After the user selects an object in the event pane 12, the process 100 then moves to state 125 wherein an event. linked to the object chosen in state 124 may be selected. Upon selection of an event, the process 100 moves to a state 126 wherein the actions to be listed in the action pane 20 are filtered. The process 100 then moves to state 127 wherein the objects and actions from the page are listed in the action pane 20, as illustrated in FIG. 1.

The process 100 then moves to state 128 wherein an object is chosen in the action pane. The process 100 then moves to a state 130 wherein an action associated with the object chosen in state 128 is selected. At this point, an object and associated event has been chosen and an object and associated action has been chosen. Using these selections, the process 100 moves to a process state 140 wherein a script is generated by the Script Wizard to link the chosen event to the chosen action. The process 140 of generating a script to link an event to an action is described more specifically below in reference to FIG. 6.

Once a script has been generated linking the chosen event to a particular action at the process 140, the process 100 moves to a process 145 wherein the generated script is displayed in either the list view or the code view. The process 145 of displaying a script in either the list view or the code view is described more specifically below in reference to FIG. 7. After the script has been displayed in the list view or the code view at the process state 145, the process 100 moves to a decision state 148 wherein the program monitors the users actions to determine whether more events are to be linked to actions. If more events do need to be linked to actions at the decision state 148, the process 100 returns to the decision state 120 to determine whether a script exists for the event chosen in the event pane 12.

If more events do not need to be linked to actions at the decision state 148, the process 100 moves to a process 150 wherein the document is rebuilt from the memory storages containing the objects, HTML text and scripts for the original document. As will be explained below in reference to FIG. 8, the Script Wizard software rebuilds the document to incorporate any new scripts that are generated at the process 140. If a new script is generated at the process 140, that script is incorporated into the rebuilt document produced at the process 150. Once the document has been rebuilt from the memory storages at the process 150, the process ends at an end state 154.

However, if a script did not exist at the decision state 120, the process 100 moves directly to the process 145 wherein the script that existed is displayed in either the list view or the code view.

E. Data structure overview

Figure 4:
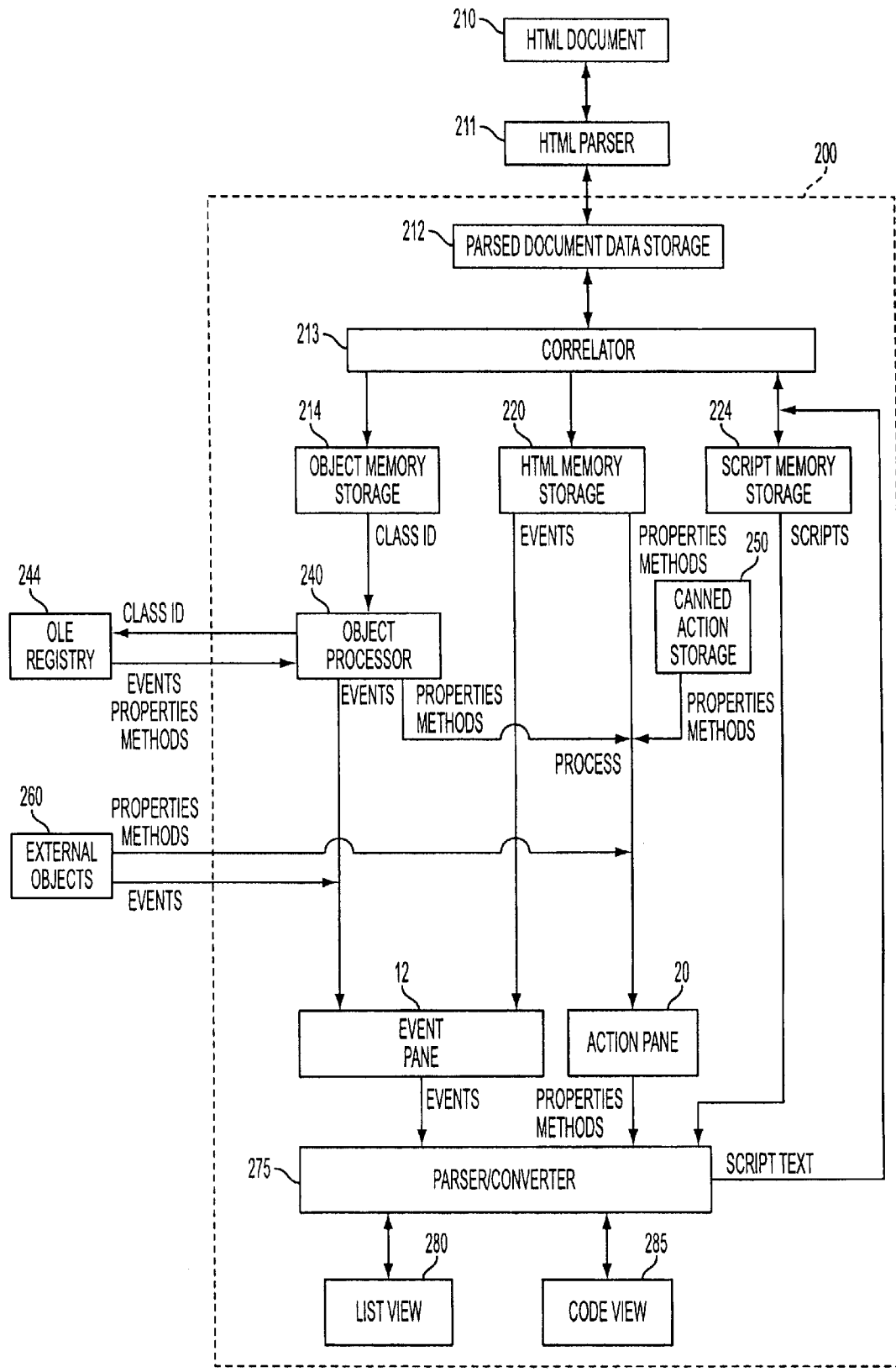
FIG. 4 is a block diagram illustrating the flow of data structures in the embodiment of FIG. 1.

FIG. 4 is a block diagram illustrating the flow of data structures within a computer system that is running the Script Wizard program 200. As shown, an HTML document 210 is fed into an HTML parser 211 that indexes the HTML document 210 into a parsed document data storage 212. The HTML parser is preferably implemented by the HTMOP-.DLL. The parsed document data storage maintains an index of the memory location of each script within the original HTML document 210. These indexed locations are used to rebuild the HTML-document once new scripts have been added.

The parsed document data storage is in communication with a correlator 213 that searches through the parsed document and sends object text, script text and HTML textinto separate memory storages. The memory storages are an object memory storage 214, an HTML memory storage 220 and a script memory storage 224. The process of parsing the HTML document 210 into the separate memory storages is described in detail in reference to FIG. 5. The object memory storage 214, HTML memory storage 220 and script memory storage 224 are preferably memories within a computer system, but could include other storages such as hard disk drives, CD-ROMs or other non-volatile storage types within a computer. The object memory storage 214 maintains a list of object class IDs and related object information that is embedded within the HTML document.

The object memory storage outputs an object class ID to an object processor 240. The object processor 240 then outputs the class ID that it received from the object memory storage 214 to the OLE registry 244 stored on the computer system. As is known, the OLE registry maintains the code for each object by its class ID. Thus, by providing the OLE registry 244 with a class ID, the events, properties and methods of the desired object can be retrieved. Thus, the OLE registry 244 outputs the corresponding events, properties and methods for the class ID that is input to the object processor 240. The object processor 240 then outputs the events to the event pane 12. The object processor 240 also outputs the properties and methods retrieved from the OLE registry 244 to the action pane 20.

The HTML memory storage 220 also outputs events to the event pane 12 corresponding to events that are associated with scriptable HTML tags. Examples of scriptable HTML tags are listed in Table 2 below and can also be found in the HTML 3.0 specification.

TABLE 2

Scriptable HTML Tags

| HTML Tag | Events | Methods | Properties |
| --- | --- | --- | --- |
| <FORM> | onSubmit | submit | action |
|  |  |  | encoding |
|  |  |  | elements[ ] |
|  |  |  | length |
|  |  |  | method |
|  |  |  | target |
| <INPUT TYPE="button"> | onClick | click | name |
|  |  |  | value |
| <INPUT TYPE="checkbox"> | onClick | click | checked |
|  |  |  | defaultchecked |
|  |  |  | name |
|  |  |  | value |
| <INPUT TYPE="hidden"> | none | none | name |
|  |  |  | value |
| <INPUT TYPE="password"> | none | focus | defaultvalue |
|  |  | blur | value |
|  |  | select | name |
| <INPUT TYPE="radio"> | onClick | click | checked |
|  |  |  | defaultchecked |
|  |  |  | length |
|  |  |  | name |
|  |  |  | value |

TABLE 2-continued

Scriptable HTML Tags

| HTML Tag | Events | Methods | Properties |
| --- | --- | --- | --- |
| <INPUT TYPE="reset"> | onClick | click | name |
|  |  |  | value |
| <INPUT TYPE="submit"> | onClick | click | name |
|  |  |  | value |
| <INPUT TYPE="text"> | onBlur | focus | defaultValue |
|  | onChange | blur | name |
|  | onFocus | select | value |
|  | onSelect |  |  |
| <SELECT> | onBlur | blur | length |
|  | onChange | focus | name |
|  | onFocus |  | options[ ] |
|  |  |  | selectedIndex |
| <TEXTAREA> | onBlur | focus | defaultValue |
|  | onChange | blur | name |
|  | onFocus | select | value |
|  | onSelect |  |  |

The HTML memory storage 220 also outputs properties and. methods to the action pane 20 so specific events in the event pane 12 can be linked to HTML scriptable tag actions. The Script Wizard program 200 also includes a canned action storage 250 that contains pre-defined methods such as "send to front" and "go to page". These canned actions are associated with the objects listed in the action pane 20. A list of canned actions for 2DML files is provided below in Table 3, while a list of canned actions for all files is provided in Table 4.

TABLE 3

Canned Actions in 2DML Files

| Canned Action | Replacement Code |
| --- | --- |
| Bring to Front | object.zorder(0) |
| Send to Back | object.zorder(1) |
| Show Control | object.visible = true |
| Hide Control | object.visible = false |

Note that language specific helper syntax will be added; for example, "call" will be inserted before the method invocation for VBScript.

TABLE 4

Canned Actions for all Files

| Canned Action | Replacement Code |
| --- | --- |
| Go To Page . . . | window.location.href = "user supplied URL" |

As shown in FIG. 4, external objects 260 also provide events to the event pane 12, and properties and methods to the action pane 20. External objects are pre-programmed objects that do not necessarily come from the original HTMLdocument 210. An example of an external object 260 is an object representing the browser software that is run on the user's computer. The browser object, for example, might appear as an object with events that are triggered by opening the browser software, closing the browser software or taking specific actions within the browser software.

The action pane 20 might also list actions from external objects 260 that relate to actions that occur within the browser software. An action within an external object such as the browser software might be a color property action that allowed the user to change the browser's background color, or a method action for launching a particular program once the browser software is initialized.

Once an event in the event pane 12 has been linked to an action in the action pane 20, the Script Wizard software 200 sends the chosen event and property or method into a parser/converter 275 to generate the VBScript or JavaScript event handlers to be associated with the chosen event. The process of generating a script to link an event to an action is described more specifically in relation to FIG. 6. The parser converter 275 then displays the generated script in either the list view 280 or code view 285.

In addition to displaying the generated script in the list view 280 or code view 285, the parser/converter 275 also outputs script programs to script memory storage 224. In this manner, the script memory 224 can remain updated with the latest event handling programs that were generated by the parser/converter 275. The script programs are sent to the script memory storage 224 in a format appropriate to be inserted into an HTML document.

In order to rebuild the HTML document 210 to include the new script programs created by the parser/converter 275, the Script Wizard software includes commands instructing the correlator 213 to insert the new programs into the proper position within the parsed document storage 212. The process undertaken by the correlator 213 to rebuild the HTML document 210 to include the newly scripted event handlers is discussed below in reference to FIG. 8. The data stored in the parsed document data storage 212 is then sent back through the HTML parser 211 to recreate the updated HTML document 210 that incorporates the new script programs.

III. Parsing documents

Figure 5:
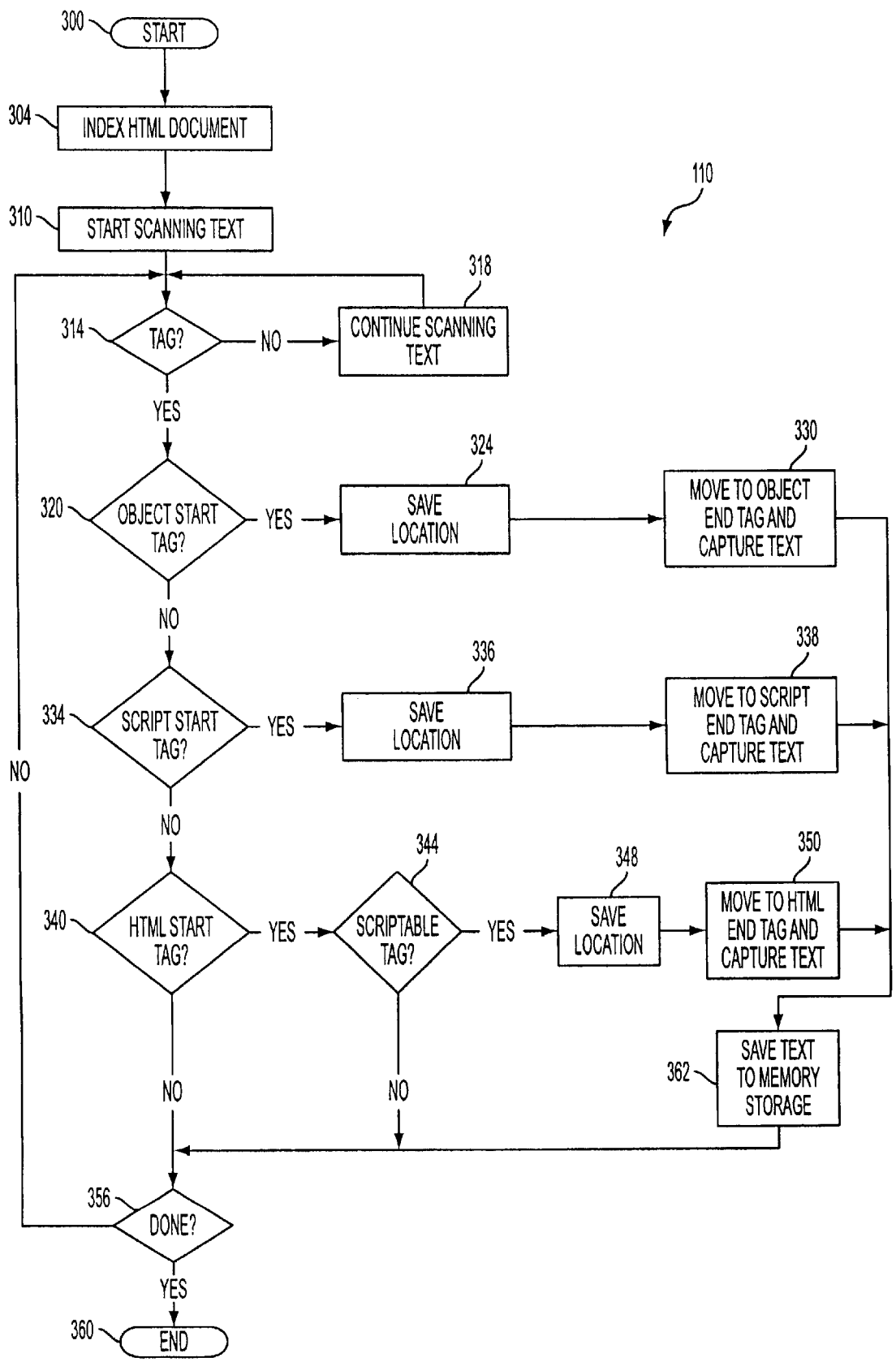
FIG. 5 is a flow diagram illustrating the "parse document process" of FIG. 3.

Referring now to FIG. 5, the "parse document into memory storages" process 110 of FIG. 3 is described in more detail. The process 110 begins at a start state 300 and then moves to a state 304 wherein the HTML document 210 is indexed by the HTML parser 211. The process 110 then moves to state 310 wherein the program begins scanning the indexed text for tags corresponding to HTML elements, objects or scripts.

The process 110 continues scanning the indexed text as it moves to a decision state 314 wherein a determination is made whether a tag has been found. If a tag has not been found at the decision state 314 then the process 110 moves to a state 318 wherein the HTML document continues to be scanned for a recognized tag. The process 110 then loops back to the decision state 314. If a tag is found at the decision state 314, the process 110 moves to a decision state 320 wherein a determination is made whether the tag is an object start tag. As is known, an object start tag in the HTML and 2DML language begins with "<OBJECT>".

If a determination is made at the decision state 320 that an object start tag has been found, the process 110 moves to a state 324 wherein the location of the object start tag within the indexed HTML document is saved. The location of the object start tag is saved so that the object text associated with the object can be returned to the same position within the HTML document when it is time for the HTML document to be rebuilt.

Once the location of the object start tag has been saved at the state 324, the process 310 moves to a state 330 wherein the program 110 moves to the object's end tag and captures the text from the start tag to the end tag. As is known, in the HTML and 2DML language, an object's end tag is the next occurrence of the tag "</OBJECT>".

If a determination is made at the decision state 320 that an object start tag is not the type of tag discovered at decision state 314, then the process moves to a decision state 334 wherein a determination is made whether a script start tag had been found. If a script start tag had been found at the decision state 334 then the process 110 moves to a state 336 wherein the location of the script start tag is saved. The process 110 then moves to a state 338 wherein the process 110 moves to the script end tag and captures the script text between the start tag and the end tag. An example of a script start tag is "<SCRIPT>" while an example of a script end tag is "</SCRIPT>".

It should be noted that scripts may be found anywhere on the page, including both the body and head sections, or the body of a 2DML file. The language used (eg: VBScript or JavaScript) in the document page is recognized based on the first language found. To recognize the type of programming language used, the Script Wizard looks for the following code.

An event handler code is recognized as:

```
1.    <SCRIPT>
      ... randomcode ...
      sub button2_dblclick ... eventhandlercode ... end sub
      ... randomcode ...
      </SCRIPT>
```

Multiple event handlers, including other non-event handler procedures, can be included in the same <SCRIPT> block. Note: VBScript only.

```
2.    <SCRIPT for = ... event = ... >
      ... eventhandlercode ...
      </SCRIPT>
3.    <INPUT TYPE = "BUTTON" ONCLICK = "call example">
```

The following types of script are considered a procedure, and are displayed in the action pane 20.

```
1.    <SCRIPT>
      ... randomcode ...
      sub example ... eventhandlercode ... end sub
      ... randomcode ...
      </SCRIPT>
```

Where "example" is not a valid event handler name (the object and event parts of the name exist on the page). "function example . . . end function" is also accepted. Multiple event handlers, including other non event handler procedures, can be included in the same <SCRIPT> block. Note: VBScript only.

```
2.    <SCRIPT>
      ... randomcode ...
      function example () {
          ... eventhandlercode ...
      }
      ... randomcode ...
      </SCRIPT>
      Note: JavaScript only.
3.    <SCRIPT>
      ... randomcode ...
      dim example    ("var example" in JavaScript)
      ... randomcode ...
      </SCRIPT>
      Global variables are defined in this way, outside of any
      procedure definition within <SCRIPT> tags.
```

Global variables are defined in this way, outside of any procedure definition within <SCRIPT> tags.

If a script start tag was not found at the decision state 334 then the process 110 moves to a decision state 340 wherein a determination is made whether the tag discovered at the decision state 314 is an HTML start tag. If an HTML start tag is found at the decision state 340, the process 110 moves to a decision state 344 wherein a determination is made whether the HTML start tag is a scriptable tag. As discussed above, a scriptable HTML tag is the type of tag that provides events and actions that can be associated with VBScript JavaScript programs. See Table 1 above for a list of scriptable HTML tags.

If a scriptable HTML tag is found at the decision state. 344, then the process 110 moves to a state 348 wherein the location of the scriptable HTML tag within the document is saved. The process 110 then advances to a state 350 and moves to the HTML end tag and captures the text between the HTML start and end tags.

It should be noted that advances in HTML programming may yield additional types of scriptable tags which may be used within the present invention. Thus, this invention is not limited to providing event handlers for object, script and HTML tags, but can be more generally used to provide scripts between events and actions of many types of objects.

However, if the type of tag recognized at the decision state 314 is not known, the process 110 moves to a decision state 356 wherein a determination is made whether the process 110 has completed scanning and reading all of the document's text.

If the process 110 has not completed scanning the document at the decision state 356, the process 110 returns to state 314 wherein a decision is made whether any more tags exist to be read. However, if the process 110 has completed scanning the document at the decision state 356, the process 110 finishes at an end state 360.

After the text of the object, script or HTML document has been captured at either state 330, 338 or 350, the process 110 moves to a state 362 wherein the captured text is saved to the appropriate memory storage. For example, the captured object text at state 330 is saved to the object memory storage 214 illustrated in FIG. 4. The script text captured at the state 338 is saved to the script memory storage 224 as illustrated in FIG. 4. In addition, the HTML text captured at the state 350 is stored to the HTML memory storage 220 illustrated in FIG. 4. Thus, the text saved to the memory storage at state 362 of FIG. 5 is saved to a particular memory storage depending on the type of text that is captured. Once the text has been saved to a memory storage at state 362, the process 110 moves to the decision state 356 to determine whether there is anymore text to be scanned.

It should also be noted that if a determination is made at the decision state 344 that the HTML tag was not a scriptable tag, the process 110 moves directly to the decision state 356 to determine whether the process 110 is done. If no more text needs to be scanned, the process 110 completes at the end state 360.

IV. Generating scripts

Figure 6:
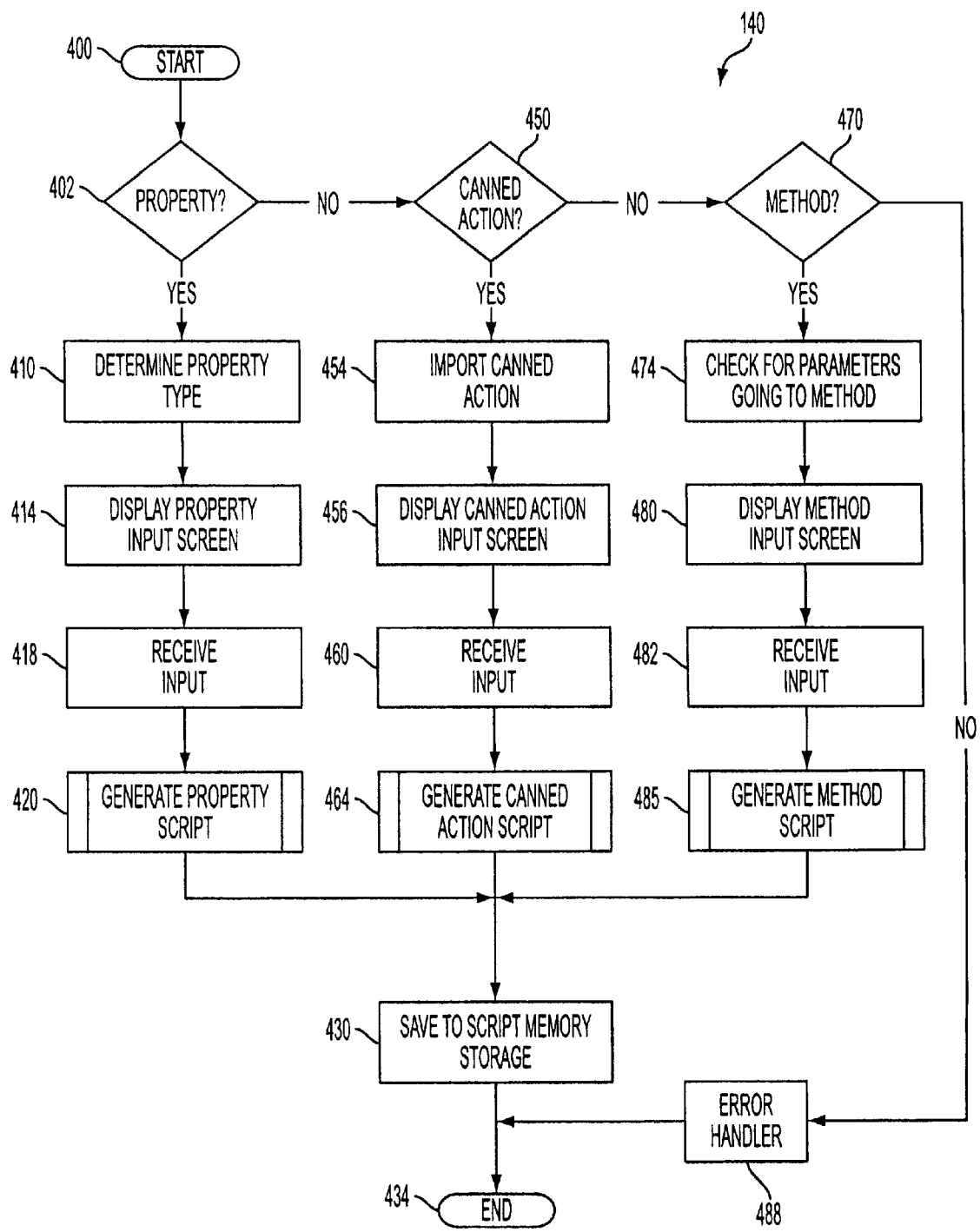
FIG. 6 is a flow diagram illustrating the "generate script to link event to action" process of FIG. 3.

FIG. 6 describes the process 140 (FIG. 3) of generating a script to link an event to an action. The process 140 begins at a start state 400 and moves to a decision state 402 wherein a determination is made whether the type of action to be linked is a property, as opposed to a method or canned action. If a determination is made at the decision state 402 that the type of action is a property, the process 140 moves to a state 410 wherein the property type is determined. The property type might be, for example, a color, a name, a label, or a position on the screen.

When linking an event to a property, the user is attempting to use the event's trigger to change a property of the object. The script, therefore, must change the chosen property to the input type once the event is triggered. Once the property type is determined at state 410, the process 140 moves to state 414 wherein the property input screen is displayed in a proper format. Thus, if the input type determined at state 410 is a color, then the color palette will be displayed as the input screen at the state 414. Similarly, if the property type determined at state 410 is for a label, a label input screen that accepts text will be displayed at the state 414.

Once the proper display input screen has been displayed at a state 414, the process 140 moves to state 418 wherein an input is received into the property input screen displayed at state 414. The process 140 then moves to a process 420 wherein a script is generated to link the chosen event to the property action.

When the Script Wizard needs to compose the code that constitutes an action in an event handler, it draws from the meta information that describes the property being set or the method being invoked as well as the capabilities of the scripting-language-specific support code. The names of the property, the method and its parameters are all taken from the meta information while the syntactic composition of the action comes from the language support code. If a property is being set, then the user supplies the value to be assigned to the property.

For example, if the user is setting the 'name' property of the 'window' object, then the Script Wizard already has the names needed to reference the property. The language support code supplies the appropriate notation to compose a name reference to the property. In both VBScript and JavaScript, the notation is a period separator (.). The resulting name is (window.name). (The parentheses are not part of the string and merely delimit the string).

To make an assignment to that property, the language support code again is identical, using an equals sign (=). The resulting string becomes (window.name=). Then the value that the user supplied in a dialog box is added to the property assignment. Assume that the user supplied (Mary's "Home" Page). To have the correct code produced for VBscript, this string must be incorporated to produce the string (window.name="Mary's " "Home" "Page").

To have the correct code produced for JavaScript, this string must be incorporated to produce the string (window.name="Mary's\"Home\" Page"). Note that the treatment of the double quote characters (") in the value is different between the two languages. Lastly, the JavaScript language support code will append a semi-colon (;) to delimit the end of the statement. The resulting string is placed into the event handler being composed.

Once the process 420 has generated a script event handler to link the chosen event to the property action, the process 140 moves to a state 430 wherein the generated script is saved to the script memory storage 224 (FIG. 4) so that it can be incorporated by the document processor 290 into the HTML document. The process then ends at an end state 434.

Based on the type of the property determined at state 410, a dialog box that is specific for one of the following property types is presented to the user for entering the property's new value:

1. String Dialog Box

A string may be entered as a type of property action. For example, in the case of the property Image1.PicturePath, there would be a "PicturePath" property exposed in the action pane 20.

When the string is received as input at state 418 and used to generate script that modifies a property at process 420, all issues of quotation mark handling are resolved automatically according to the requirements of the programming language.

This includes enclosing the property value in quotation marks as appropriate, as well as performing appropriate 'escaping' of quotation marks found in the property value."

2. A Color Dialog Box

Selecting to edit a color type of property will present a Windows Color Dialog box to the user. It will read the value in the string and interpret any string which is a hexadecimal number, or a hexadecimal number prefixed with a "#" symbol, according to HTML rules (ie, rrggbb). When writing the value from the Color dialog back out, the notation "#rrggbb" is used.

3. A Number Dialog Box

For any integer valued property, a number dialog box will be displayed to the user. Only valid decimal, hexadecimal, or octal numbers in the syntax of the current programming language may be entered in this dialog. If an invalid number is entered, when OK is pressed, an error dialog will be displayed and the user will be forced to correct the entry.

Other types of property dialog boxes can be displayed to the user which include error correction so that only valid input is received by the process 140 in order to generate the scripts. During the process 420, the modified property value is generated into script by creating the following string:

object.propertyname=user_supplied_string

This string is then inserted into the code pane 30 of the Script Wizard window 10. In the code pane 30, the script will be shown as "Change propertyname to newvalue". In addition, "Modify Value." button 90 will be enabled so that the user can see and edit the current property setting the scripted property. Depressing the "Modify Value." button 90 brings up the same dialog box as the original one displayed in state 414.

If for some reason, a script cannot be generated for the property at process 420, an error message "You have entered an illegal string" will be displayed, returning the user back to state 414 to display the property input screen to the user.

If a determination is made at the decision state 402 that the action is not a property, then the process 140 moves to a decision state 450 wherein a determination is made whether the action was a canned action. As described above, a canned action is a type of action that has been predefined within the Script Wizard 200. The canned actions are normally associated with every object listed in the action pane 20 to provide the user with the flexibility to add certain actions to every object.

If a determination is made at the decision state 450 that the action is a canned action, the process 140 moves to a state 454 wherein the canned action is imported from the canned action storage 250 (FIG. 4). The codes for canned actions can be found in Tables 2 and 3 above. Once the desired canned action is imported at state 454, the process 140 moves to a state 456 and displays a canned action input screen for the chosen action to the user. The canned action input screen might be a dialog box corresponding to a property, method or variable depending on the type of canned action selected by the user. Once the canned action input screen is displayed at the state 456, the process 140 moves to a state 460 wherein the user's input is received at the input screen. The process 140 then moves to a process 464 wherein the canned action script linking the event to the chosen canned action is generated.

For example, the canned action might be "send to front" wherein this action causes a particular object to be sent to the foreground of the browsing software when triggered by a particular event. Thus, a user might link an event such as a mouse click to a canned action of "bring to front" so that by triggering the chosen event with a mouse click another object is brought to the forefront of the browsing software. The canned action script is generated at state 464 by inserting the proper code (from Table 2 or 3) into a script.

Canned actions are handled similarly to properties and methods except that the way that a canned action is presented in the user interface of the Script Wizard is divorced from the resulting code in the event handler. For example, the canned action "Goto Page . . . " is implemented as a property assignment, while the "Bring to Front" canned action is implemented as a method invocation. The Script Wizard accomplishes this by maintaining a special storage for the names of the canned actions as well as meta information that. tells the language support code how to compose the statement that runs the canned action.

These are the actions taken for the Script Wizard's List View. In the case of Code View, no user interaction takes place to compose the code added to the event handler. As a result, assignments are not composed when a property action is inserted by the user, simply a name reference to the property. When a method action is inserted, the same behavior as in the case of the List View is produced.

Once the canned action script is generated at the process state 464, the process 140 moves to state 430 and saves the generated script to the script memory storage 224. The process then ends at the end state 434.

However, if a determination is made at the decision state 450 that the action is not a canned action, the process 140 moves to a decision state 470 wherein a determination is made whether the chosen action is a method. If the chosen action is a method at the decision state 470, the process 140 moves to a state 474 and checks for any parameters that might be going from the event to the chosen method. The process 140 then moves to a state 480 and displays an appropriate method input screen based on the type of method chosen by the user. Once the appropriate method input screen has been displayed at the state 480, the process 140 moves to state 482 wherein input from the user is received into the input screen displayed at state 480. The process 140 then moves to state 485 and generates the method script that is stored in the script memory storage 224 at state 430.

As an example of a method invocation, consider the invocation of the 'Show' method of the 'Button' object. The invocation is again a merging of the names taken from the meta information describing the 'Show' method and the syntactic requirements dictated by the language support code. The resulting invocation string for VBScript is call Button.Show( )

while the JavaScript support code would generate

Button.Show( );

The introduction of "call", the period and the parentheses are the implemented by the language support code.

If there had been parameters on the method, then the names of the parameter would have been taken from the. description of the 'Show' method, and the syntax needed to incorporate those names into the method invocation would have been supplied by the language support code. As a brief example, if the 'Show' method included two parameters 'x' and 'y', the resulting invocation strings would have been:

| | |
|---|---|
| call Button.Show (x, y) | VBScript |
| or | |
| Button.Show (x, y); | JavaScript |

If the action is not a property, canned action or method, the process 140 moves to state 488 to provide error handling. The process 140 then ends at the end state 434.

V. Displaying scripts in list view or code view

Figure 7:
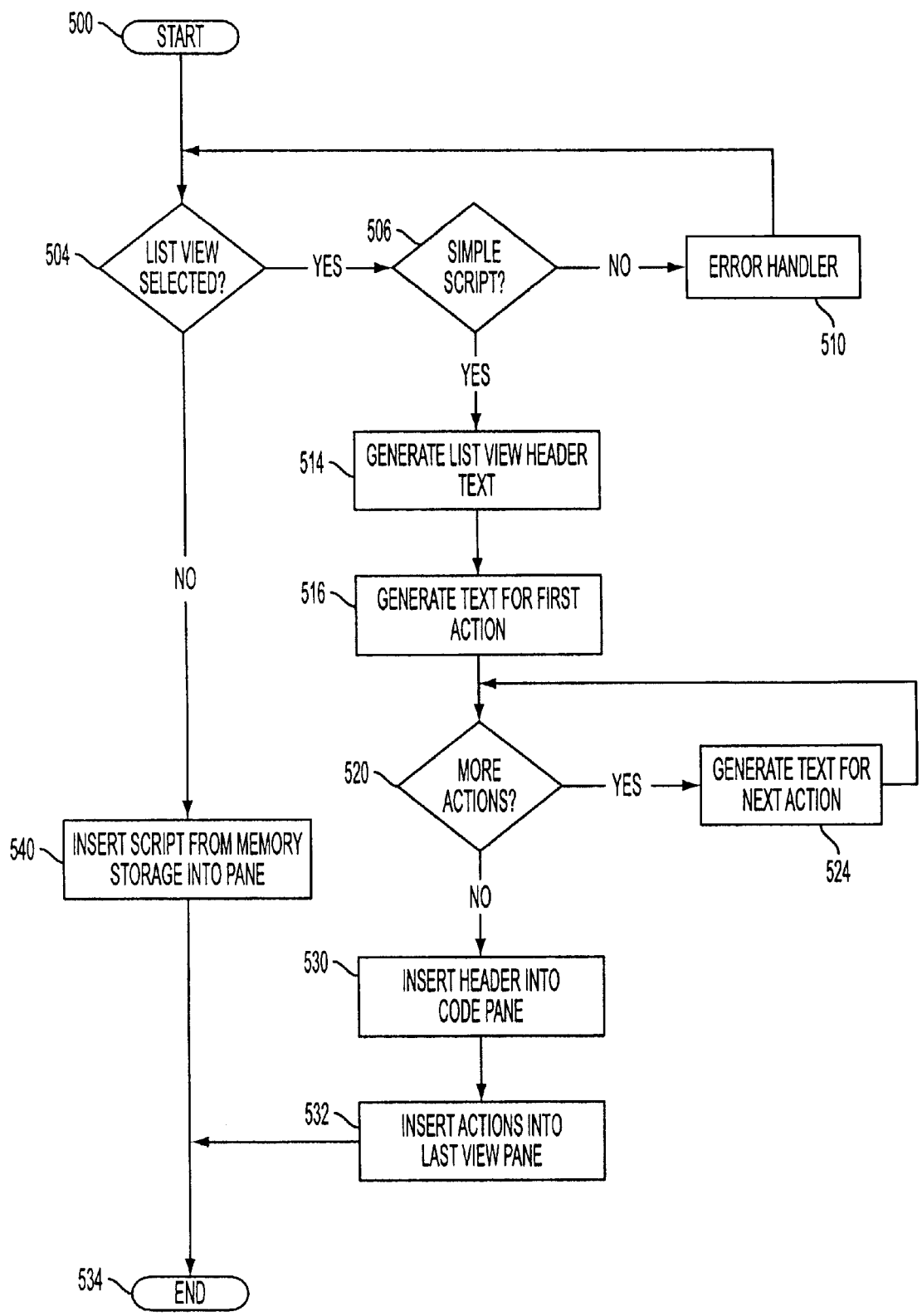
FIG. 7 is a flow diagram illustrating the "display script in list view or code view" process of FIG. 3.

Referring now to FIG. 7, the process 145 of displaying a script in a list view or code view from FIG. 3 is explained more particularly. The process 145 begins at a start state 500 and moves to a decision state 504 wherein a determination is made the list view radio button 60a (FIG. 1) has been selected. If the list view radio button 60a is selected at the decision state 504, the process 145 moves to a decision state 506 wherein a determination is made whether the script to be displayed in the code pane 30 is a simple or complicated script.

If a determination is made at the decision state 506 that the script to be displayed is not a simple script, then the process 145 moves to state 510 which provides an error handler that displays a particular error message to the user, indicating that the script linking the event to the action is too complicated to displayed as a list of concise statements within the code pane 30. The process 145 then returns to the decision state 504.

However, if a determination is made at the decision state 506 that the script is a simple script, the process 145 moves to state 514 wherein the list view header text is generated. The process 145 then moves to state 516 wherein the text for the first action to be listed as a concise statement in the code pane 30 is generated. The process 145 then moves to a decision state 520 wherein a determination is made whether more actions to be listed in the code pane 30 are linked to the chosen event. If more actions do exist, the process 145 moves to state 524 wherein the text for the next action is generated.

The process 145 then returns to the decision state 520 to continue determining whether more actions exist that are linked to the chosen event. If more actions do not exist at the decision state 520, the process 145 moves to state 530 wherein the header information 75 is inserted into the code pane 30 so that it can be displayed to the user.

Once the header information 75 has been inserted into the code pane 30, the process 145 moves to state 532 wherein the generated actions are inserted into the code pane 30. The process 145 then ends at an end state 534.

If a determination is made at the decision state 504 that the list view radio button 60a was not chosen (e.g. the code view radio button 60b is chosen), the process 145 moves to state 540 wherein the corresponding script stored in the script memory storage 224 is inserted into the code pane 30 and displayed to the user. The process 145 then ends at the end state 534.

VI. Rebuilding documents from memory storages

When the Script Wizard software is closed, all of the changes that were made to the scripts must be reintegrated into the HTML document 210. Existing scripts, whether they have been edited or not, are saved back into the HTML document 210 in the same way they were found. In particular, the following attributes of the script are maintained:

1. Location in the HTML document.
2. Inline (event handler included in element tag) vs. External (<SCRIPT>).
3. "<SCRIPT for=button2 event=dblclick> </SCRIPT>" vs. "<SCRIPT> sub button2_dblclick </SCRIPT>"
4. In the case of "sub button2_dblclick", in the same <SCRIPT> block as other scripts, if the <SCRIPT> block contained more than one script when the page was loaded.
5. All non-event handler scripts maintain relative position to all other event handler scripts.
6. Presence of HTML comment tags around the script.

All new external event handlers that are generated by the Script Wizard in processes 420, 464 and 485 are placed before and as near as possible to the object in the HTML document within the <BODY> tags, or before the <DIV> tag in the case of a 2DML file. Script text is sent from the script memory storage 224 to the document processor 290 in the following forms:

```
VBScript:
    <SCRIPT language="vbs">
        sub object_event
            ... inserted event handler code ...
        end sub
    </SCRIPT>
JavaScript:
    <OBJECT> items:
        <SCRIPT for= event=>
            ... inserted event handler code ...
        </SCRIPT>
    non-<OBJECT> items:
        placed inline with the tag which contains the
        scripted element
```

All global variables and user defined procedures will appear between <SCRIPT> tags within the <HEAD> section of the HTML document, or before any event handlers in the case of a 2DML file. If a new <SCRIPT> tag is inserted before all others on the HTML document, a language specification of either VBScript or JavaScript will be made in the <SCRIPT> tag. In addition, all of the <SCRIPT> code will be included inside HTML comment tags: <!— ... —>. If loaded script did not include the comment tags, none will be placed on them when the HTML document is reconstructed.

Figure 8:
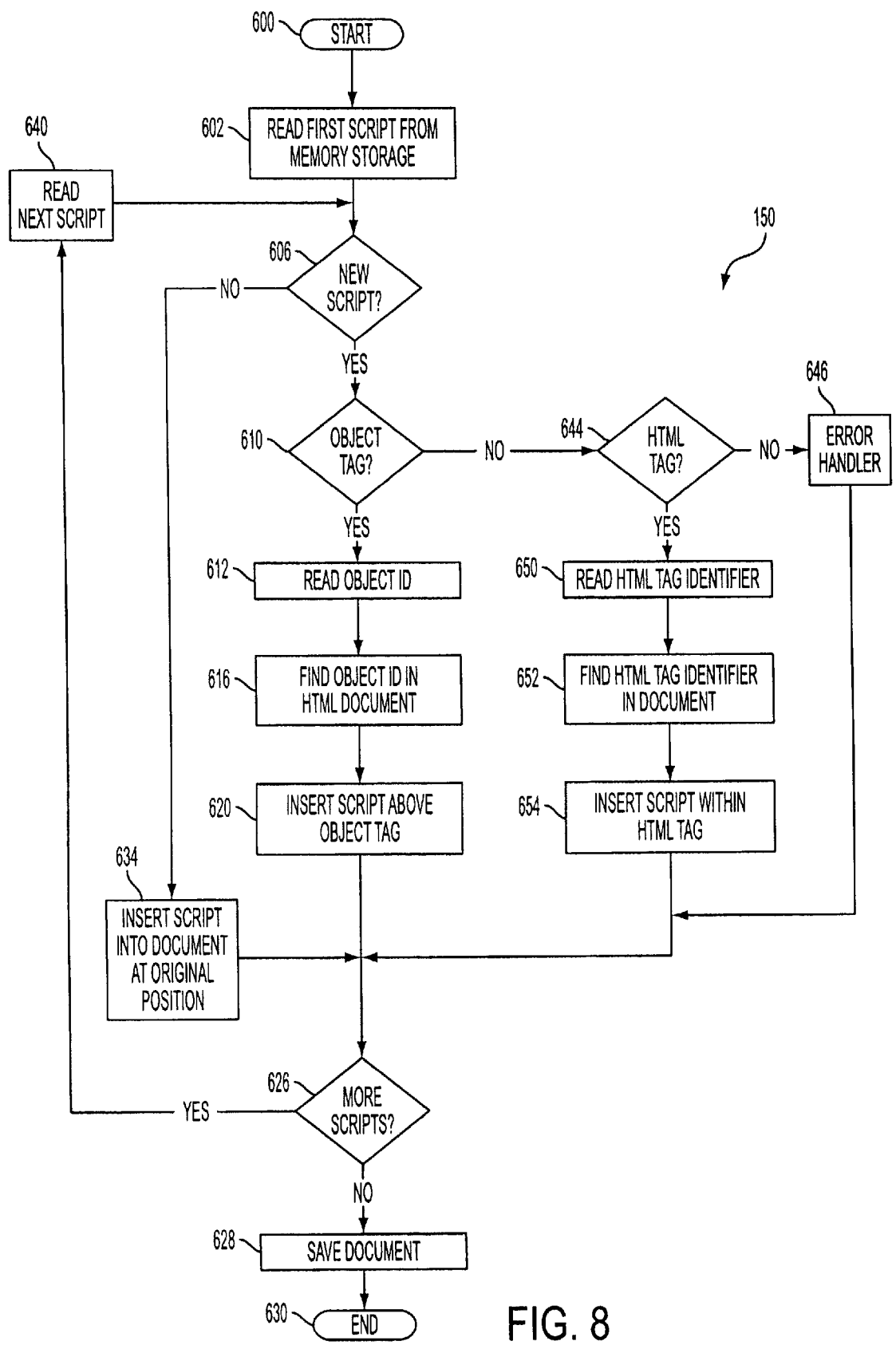
FIG. 8 is a flow diagram illustrating the "rebuild. document from memory storages" process of FIG. 3.

Referring now to FIG. 8, the process 150 of rebuilding the document from the memory storages is illustrated. The rebuild process 150 begins at a start state 600 and then moves to a state 602 wherein the first script stored in the memory storage is read. As discussed above in reference to FIG. 4, the script memory storage 224 is a computer memory that includes the parsed scripts that have been separated from the original HTML document 210. In addition, the newly created scripts from parser/converter 275 (FIG. 4) are saved to the script memory storage 224. Once the rebuild process 350 reads the first script stored in the script memory storage 224 at state 602 the process 150 moves to a decision state 606 wherein a determination is made whether the script that was read from the script memory storage 224 is a new script or one that was included in the original HTML document 210.

If a determination is made at the decision state 606 that the script did not exist in the original HTML document 210, the process 150 moves to another decision state 610 wherein a determination is made whether the tag associated with the stored script is an object tag. As discussed above, the VBScript and JavaScript event handlers can be associated with either an object tag embedded in the HTML document, or an HTML scriptable tag embedded within the HTML document.

If a determination is made at the decision state 610 that the tag associated with the script read from memory at state 602 is an object tag, the process 150 moves to a state 612 wherein the object ID of the object tag is read. As is known, within the HTML language, the object ID is normally embedded within the object tag. Thus, the process 150 can readily determine the object ID of the current object.

Once the object ID has been read at the state 612, the process 150 moves to state 616 wherein a search is initiated to find the same object ID within the HTML document 210. In this manner, the process 150 can determine the appropriate insertion point for the stored script. Once the object ID has been found within the HTML document at state 616, the process 150 moves to state 620 wherein the script is inserted into the indexed HTML document in the parsed document data storage 211 at a position directly above the object tag. After the script has been inserted into the indexed HTML document at a position just above the found object tag, the process 150 moves to a decision state 626 in order to determine whether more scripts exist within the script memory storage 224 that need to be inserted into the HTML document 210. If no more scripts are stored within the script memory storage 224, the process 150 moves to a state 628 wherein the HTML document 210 is saved and the process ends at an end state 630.

If a determination is made at the decision state 606 that the script read from the script memory storage 224 is not a new script, but rather had already been stored within the HTML document, the process 150 moves to a state 634 wherein the script is inserted into the indexed HTML document at its original position. Since the location of each script that is parsed from the HTML parser 211 and stored in the parsed document data storage 212 is saved, the scripts can be readily reinserted into their original position in the HTML document.

Once the script is been inserted into the indexed HTML document at its original position, the process 150 moves to state 626 to determine whether any additional scripts exist that need to be incorporated into the HTML document. If no more scripts need to be incorporated, the process 150 continues as discussed above.

However, if more scripts do exist to be incorporated within the HTML document, the process 150 moves to a state 640 wherein the next script stored within the script memory storage is read. The process 150 then moves to the decision state 606 to determine whether the script read at the state 640 is new. If the script is determined to be new at the decision state 606, the process moves to state 610 to determine whether the associated tag is an object tag. If a determination is made that the tag associated with the script is not an object tag, the process 150 moves to a decision state 644 to determine whether the tag is an HTML scriptable tag. If a determination is made that the tag is not an HTML scriptable tag, the process 150 moves to an error handler 646 and then returns to the decision state 626 in order to determine whether more scripts exist to be read.

If a determination is made at the decision state 644 that the tag associated with the script is an HTML scriptable tag, the process 150 moves to a state 650 wherein the HTML tag identifier is read from the HTML tag. The HTML tag identifier is the name given to the particular HTML scriptable tag when it is originally created. Because these tag identifiers are unique within the HTML document, the process 150 can be assured that searching for the HTML tag identifier will lead to the proper insertion point within the HTML document. The process 150 then moves to state 652 to find the location of the HTML tag identifier in the HTML document. Once the HTML tag identifier has been found at the state 652, the process 150 inserts the script within the HTML tag at a state 654. As is known, HTML scriptable elements normally include the script code within the starting and ending codes for the HTML scriptable tag.

Once the script has been inserted within the HTML tag at the state 654, the process 150 moves to the decision state 626 wherein a determination is made whether more scripts exist to be read. If no more scripts exist, the process moves to state 628 in order to save the document and then to state 630 to end.

VII. Other Embodiments

Although the present invention has been described herein with reference to a program for creating and editing event handler scripts of Internet documents, it will be recognized that the invention is not so limited, and that various features of the invention can be applied to other programming-related applications. For example, the automatic script generation features can be used to generate other types of event handlers, including event handlers that are not embedded within Internet documents and event handlers written in other programming languages. In addition, the code/list view feature can be extended to computer programs other than event handlers. Accordingly, the scope of the invention should be defined only in accordance with the attached claims.

In the claims which follow, reference characters used to designate claim steps are provided for convenience of description only, and are not intended to imply any particular order for performing the steps.

VIII. Conclusion

The Script Wizard software provides a system and method for easily creating event handlers that allow an event triggered in one object on an HTML document to modify properties or call methods on a different object within the HTML document. The Script Wizard window presents the user with three panes, an event pane, an action pane and a code pane. Within each pane is a hierarchical tree listing objects, events and actions for the HTML or 2DML document.

The user first selects event in the event pane by highlighting the chosen event with the mouse cursor. The user then selects an action to be linked with the event. After selecting a particular action, the user inputs properties or calls a method to be run once the chosen event is triggered. The Script Wizard software then builds a VBScript or JavaScript event handler that is run once the chosen event is triggered.

Because the user does not need to know any programming language to generate the event handler that links the chosen event with an action, novice programmers can use the Script Wizard software to easily produce complicated HTML documents. In addition, since the code pane provides both a list view and a code view to the user, a selection can be made to view the generated VBScript or JavaScript in a simple, English language form or a the more complicated code form.

What is claimed is:

1. A method in a computer for generating an event handling program that is triggered upon activation of an event on an object, comprising the computer implemented steps of:

a) displaying a graphical representation of objects and events in a first region of a computer screen;

b) displaying a graphical representation of objects and actions in a second region of said computer. screen;

c) monitoring said first region and said second region of said computer screen for interaction by a user; and d) generating a program responsive to said interaction by said user, wherein said program includes commands for performing an action displayed in said second region in response to a triggering of an event displayed in said first region.

2. The method of claim 1, wherein step d) comprises generating an event handling program.

3. The method of claim 1, wherein step d) comprises generating a script.

4. The method of claim 3, wherein said script is generated in the Visual Basic, Java, VBScript or JavaScript. language.

5. The method of claim 1, wherein said graphical representation of events comprises a hierarchical tree.

6. The method of claim 1, wherein said graphical representation of actions comprises a hierarchical tree.

7. The method of claim 1, further comprising the step of:

e) translating said program into a human-readable simplified narrative reflective of said program.

8. The method of claim 7, further comprising the step of:

f) displaying said simplified narrative in a third region of said computer screen.

9. The method of claim 1, wherein said actions are a property or method of an Object Linking and Embedding (OLE) object, a Corba object, a Java Bean, an OpenDoc object or an HTML scriptable object.

10. The method of claim 1, wherein step b) comprises displaying a dialog box for receiving property settings from said user.

11. The method of claim 1, wherein step b) comprises filtering said actions so that said graphical representation only displays a portion of the available actions.

12. The method of claim 1, wherein step c) comprises monitoring said interaction by a user to detect the selection of an event in said first region and an action in said second region.

13. The method of claim 12, wherein step d) comprises generating said program to perform the action selected in the second region with the event selected in the first region.

14. A method in a computer for linking an event triggered by a first object referenced in an Internet document to an action performed by a second object referenced in said Internet document, comprising the computer implemented steps of:

a) displaying a representation of at least one event associated with the first object on a first region of a computer screen;

b) displaying a representation of at least one action associated with the second object on a second region of said computer screen;

c) monitoring said first region and said second region of said computer screen for interaction by a user; and d) generating a program responsive to said interaction by said user, wherein said program includes commands for performing an action displayed in said second region in response to a triggering of an event displayed in said first region.

15. The method of claim 14, wherein step d) comprises generating an event handling program.

16. The method of claim 14, wherein step d) comprises generating a script.

17. The method of claim 16, wherein said script is written in the VBScript or JavaScript language.

18. The method of claim 14, wherein said first object and said second object are Object Linking and Embedding (OLE) objects, Corba objects, Java Beans, OpenDoc objects or HTML. scriptable objects.

19. The method of claim 14, wherein step b) comprises displaying a dialog box for receiving property settings from said user.

20. The method of claim 14, wherein said representation of at least one event associated with said first object is in the form of a hierarchical tree.

21. The method of claim 14, wherein said representation of at least one action associated with said second object is in the form of a hierarchical tree.

22. The method of claim 14, further comprising the step of:

e) translating said program into a simplified, non-executable narrative reflective of said program.

23. The method of claim 22, further comprising the step. of:

f) displaying said non-executable narrative in a third region of said computer screen.

24. The method of claim 14, wherein said Internet document is written in the Hypertext Markup Language (HTML).

25. The method of claim 14, further comprising the step of:

e) inserting said program into said Internet document.

26. The method of claim 14, wherein step b) comprises filtering said at least one action so that said representation only displays a portion of the available actions.

27. The method of claim 14, wherein step c) comprises monitoring said interaction by a user to detect the selection of an event in said first region and an action in said second region.

28. The method of claim 27, wherein step d) comprises generating said program to perform an action selected in the second region with an event selected in the first region.

29. A system in a computer for linking events of objects referenced in an Internet document to actions of objects referenced in said Internet document, comprising:

a user interface providing a first representation of a first object and at least one event associated with said object, said user interface additionally providing a second representation of a second object and at least one action associated with said object, wherein said first object and said second object are referenced by an Internet document; and commands for automatically generating a program that links an event associated with said first object to an action associated with said second object in response to a user's request.

30. The system of claim 29, wherein said commands comprise commands for generating an event handling program.

31. The system of claim 29, wherein said commands comprise commands for generating a script.

32. The system of claim 31, wherein said script is generated in the Visual Basic, Java, VBScript or JavaScript language.

33. The system of claim 29, wherein said actions are properties or methods of an Object Linking and Embedding (OLE) object.

34. The method of claim 29, wherein said actions are properties or methods of an HTML scriptable object.

35. The system of claim 29, wherein said first representation of a first object and associated events is in the form of a hierarchical tree.

36. The system of claim 29, wherein said second representation of a second object and associated actions is in the form of a hierarchical tree.

37. The system of claim 29, further comprising a converter for converting said program into a human readable, non-executable form.

38. The system of claim 37, wherein said converter comprises a look up table to convert simple actions into corresponding human-readable explanations.

39. The system of claim 29, wherein said user interface comprises a display region for displaying a simplified narrative reflective of said program.

40. The system of claim 29, wherein said representation of said first object and said representation of said second object comprise a graphical indicator indicative of a program being associated with an event.

41. The system of claim 29, wherein said representation of said first object and said representation of said second object are graphical.

42. An apparatus in a computer for linking events of objects referenced in an Internet document to actions of objects referenced in said Internet document, comprising:

means for providing a first graphical representation of objects and events and providing a second graphical representation of objects and actions, wherein said objects are referenced by an Internet document; and means for generating a program, wherein said program performs an action displayed in said second graphical representation in response to an event displayed in said first graphical representation.

43. The apparatus of claim 42, wherein said means for generating a program comprise commands for generating an event handling program.

44. The apparatus of claim 42, wherein said means for generating a program comprise commands for generating a script.

45. The apparatus of claim 44, wherein said script is generated in the VBScript or JavaScript language.

46. The apparatus of claim 42, wherein said actions are properties or methods of an Object Linking and Embedding (OLE) object, HTML scriptable object, Java Bean or OpenDoc object.

47. The apparatus of claim 42, further comprising a converter for converting said program into a human readable, non-executable form.

48. The apparatus of claim 47, wherein said converter comprises a look up table to convert simple actions into corresponding human-readable explanations.

49. The apparatus of claim 42, wherein said user interface comprises a display region for displaying a simplified translation of said event handling program.

50. A method of automatically generating an event handling program, comprising the computer-implemented steps of:

(a) monitoring user activity in a first region of a display to detect selection by a user of an event associated with a first object:

(b) monitoring user activity in a second region of the display to detect selection by the user of an action associated with a second object; and (c) automatically generating an event handling program which links the event selected in step (a) to the action selected in step (b).

51. The method of claim 50, wherein step (c) comprises generating the event handling program in a scripting language.

52. The method of claim 50, wherein the event handling program performs the action selected in step (b) when the event selected in step (a) is triggered.

53. The method of claim 50, wherein the first an second objects form part of an Internet document, and the method further comprises embedding the event handling program within the Internet document.

54. The method of claim 50, further comprising displaying the event handling program to the user in a non-executable, human-readable form.

55. A method for editing an event handling program stored in an Internet document, wherein said event handling program links a first set of events on a first object to a first set of actions of a second object, comprising the computer implemented steps of:

a) parsing the Internet document to identify said event handling program linking said first set of events of said first object to said first set of actions of said second object;

b) displaying a representation of said first set of events associated with said first object on a first region of a computer screen;

c) displaying a representation of said first set of actions associated with said second object on a second region of said computer screen; and d) displaying said event handling program in a third region of said computer screen.

56. The method of claim 55, further comprising the computer implemented steps of:

e) displaying a representation of a second set of events on said first region of said computer screen and displaying a representation of a second set of actions on said second region of said computer screen:

f) monitoring said first region and said second region of said computer screen for interaction by a user; and g) generating a new event handling program in response to said interaction by said user; wherein said new event handling program includes commands for performing at least one action of said second set of actions displayed in said second region when at least one event of said second set of events displayed in said first region is triggered.

57. The method of claim 55, wherein said event handling program is a script.

58. The method of claim 57, wherein said script is written in the Visual Basic, Java, VBScript or JavaScript language.

59. The method of claim 55, wherein said representation of said first set of events associated with said first object is in the form of a hierarchical tree.

60. The method of claim 55, wherein said representation of said first set of actions associated with said second object is in the form of a hierarchical tree.

61. The method of claim 55, wherein step d) comprises displaying a simplified translation of said event handling program.

62. The method of claim 61, wherein said simplified translation of said event handling program comprises a header line and a body.

63. The method of claim 55, wherein step c) comprises displaying a dialog box for setting properties.

* * * * *

UNITED STATES PATENT AND TRADEMARK OFFICE
CERTIFICATE OF CORRECTION

PATENT NO. : 6,268,852 B1
DATED : July 31, 2001
INVENTOR(S) : Greg Lindhorst et al.

It is certified that error appears in the above-identified patent and that said Letters Patent is hereby corrected as shown below:

<u>Column 24,</u>
Line 54, delete "computer. screen" and insert -- computer screen --.

<u>Column 26,</u>
Line 3, delete "step. of:" insert -- step of --.

Signed and Sealed this

Thirty-first Day of December, 2002

JAMES E. ROGAN
*Director of the United States Patent and Trademark Office*